United States Patent [19]

Byrne

[11] 4,254,464
[45] Mar. 3, 1981

[54] COMMON DATA BUFFER SYSTEM

[75] Inventor: Frank Byrne, Cocoa Beach, Fla.

[73] Assignee: The United States of America as represented by the Administrator of the National Aeronautics and Space Administration, Washington, D.C.

[21] Appl. No.: 23,437

[22] Filed: Mar. 23, 1979

[51] Int. Cl.³ .................. G06F 13/00; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,599,162 | 8/1971 | Byrns et al. | 364/200 |
| 4,034,347 | 7/1977 | Probert, Jr. | 364/200 |

Primary Examiner—Gareth D. Shaw
Assistant Examiner—Thomas M. Heckler
Attorney, Agent, or Firm—Thomas O. Harrell; John R. Manning

[57] ABSTRACT

A high speed common data buffer system is described for providing an interface and communications medium between a plurality of computers utilized in a distributed computer complex forming part of a checkout, command and control system for space vehicles and associated ground support equipment. The system includes the capability for temporarily storing data to be transferred between computers, for transferring a plurality of interrupts between computers, for monitoring and recording these transfers and for correcting errors incurred in these transfers. Validity checks are made on each transfer and appropriate error notification is given to the computer associated with that transfer.

3 Claims, 6 Drawing Figures

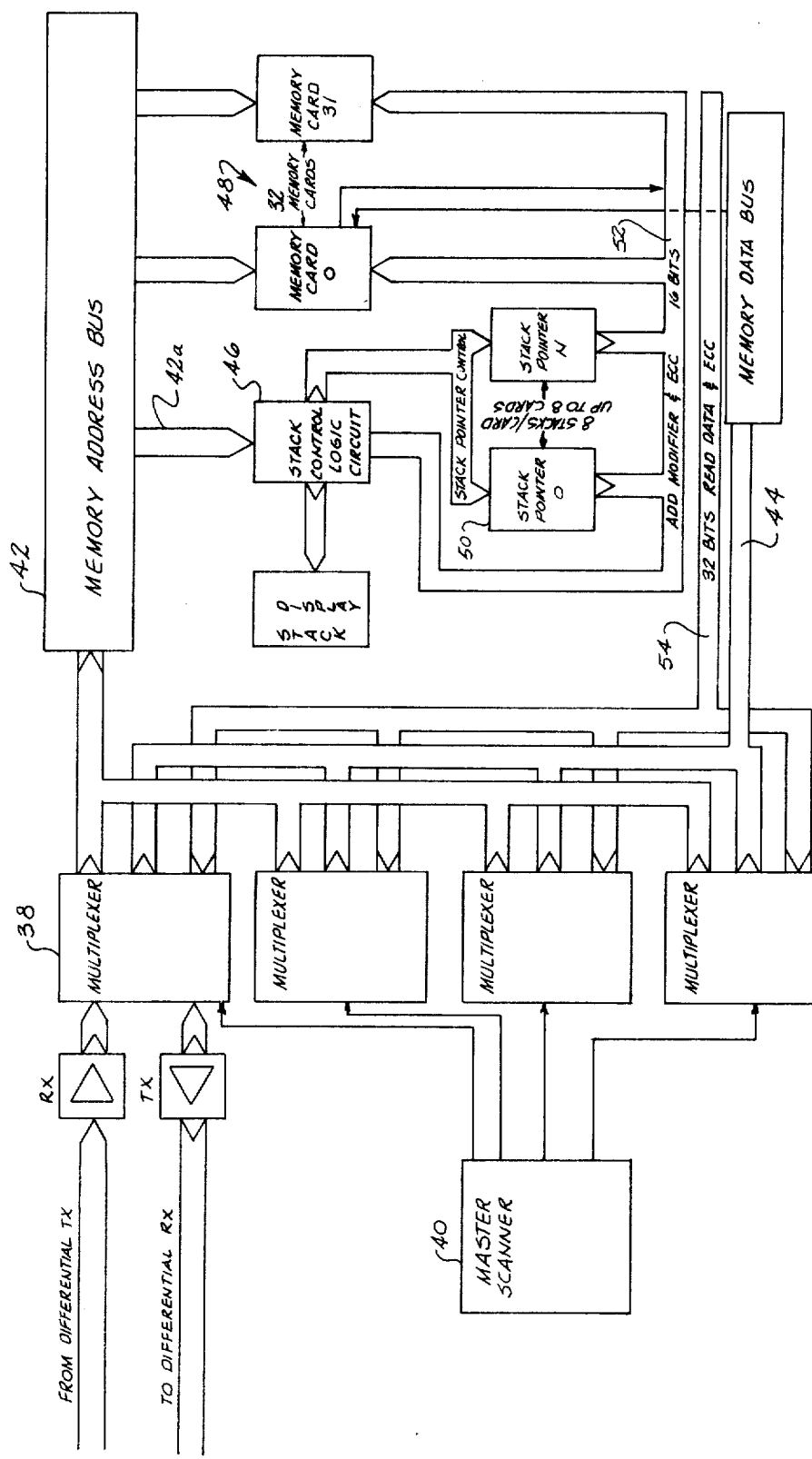

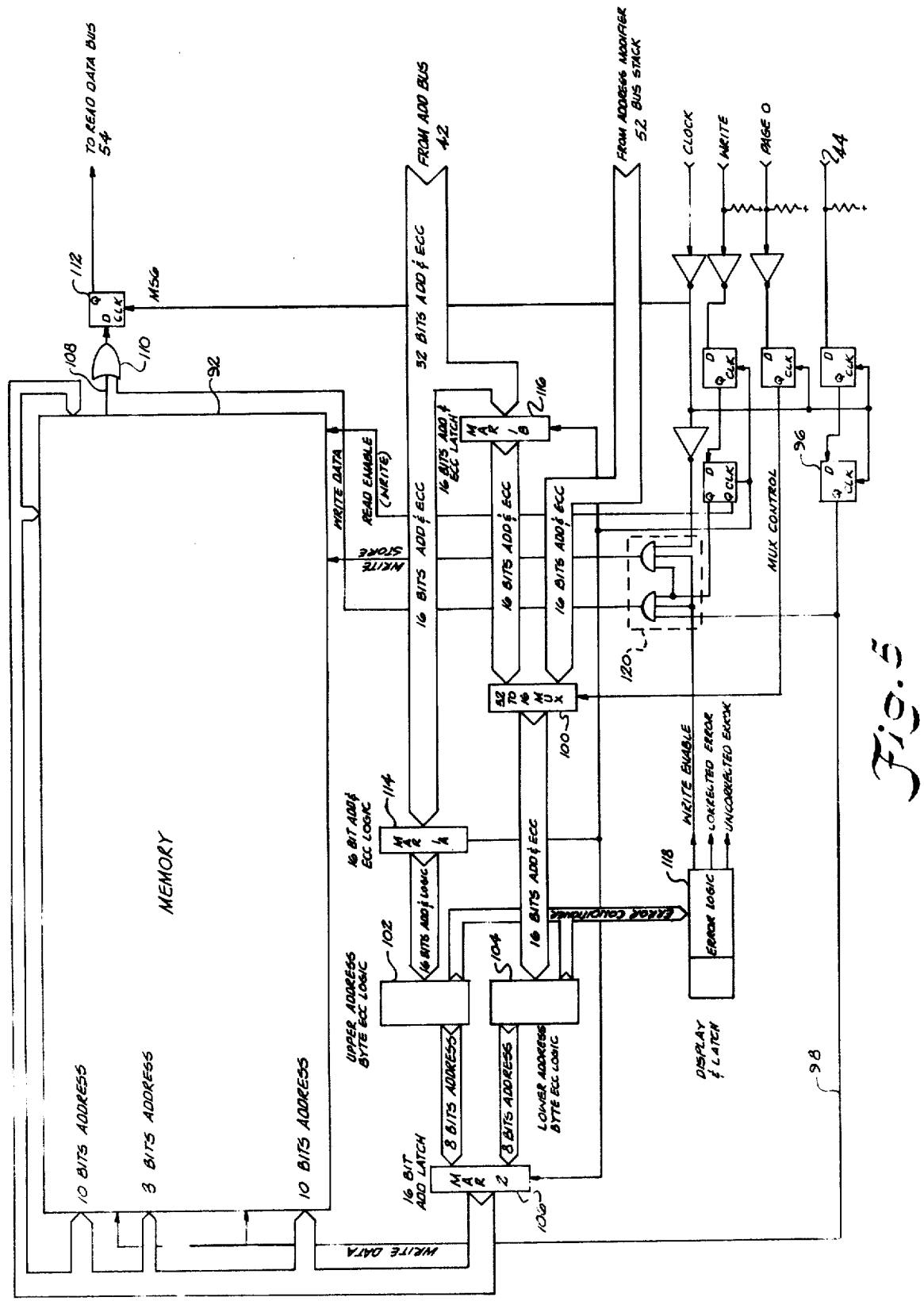

COMMON DATA BUFFER SYSTEM

ORIGIN OF THE INVENTION

The invention described herein was made by an employee of the United States Government and may be manufactured and used for the Government for governmental purposes without the payment of any royalties thereon or therefor.

BACKGROUND OF THE INVENTION

The present invention relates to a system for communicating with computational equipment utilized in checkout, launch and operation of space vehicles such as a space shuttle, and more particularly to a system wherein a plurality of computers may be used for controlling, processing, feeding, and receiving information from throughout the system with a provision for any computer to interrupt the operation of any other computer.

Heretofore, automated equipment utilized for checking out, launching, and operating a space vehicle was comprised of computers, displays (man-machine interfaces) and end item controllers interconnected by a limited communications medium, thereby making simultaneous parallel processing by several computers difficult if not impossible to implement. As a result of these restrictions, processing was performed serially, requiring considerable operating time, human intervention, and operational constraints prohibiting the checkout system from taking advantage of the specialized capabilities of certain computers.

SUMMARY OF THE INVENTION

The invention pertains to a common data buffer system for use in transferring information to and from various computer systems contained within a distributed computer system utilized for checking out, launching, and operating a space vehicle.

The common data buffer system possesses the capability for temporary storage of data, commands, messages, and error correction information as well as the capability for temporarily storing, routing, and transmitting interrupt signals to and from computers connected to the common data buffer system. Additionally, the common data buffer system is timeshared among the users of the system in such a manner so as to appear to each user as if he were the sole user of a predesignated portion of the common data buffer system.

The system includes a plurality of register files contained within buffer access cards which are capable of storing information coming from respective computers. A high speed scanner is connected to each of the register files. The scanner is provided for transferring the information stored in the register files in a predetermined sequence to and from the common data buffer memory. Selected portions of the common data buffer memory are reserved for certain computers. The addresses of the protected areas are monitored by address validity logic circuits to prohibit accidental and unauthorized modification and alteration of the memory by computers that have been excluded from that protected portion of the memory.

Assuming that the address is proper, the information is transferred between a plurality of buffer access cards containing register files, and the common data buffer main memory.

The transfer of the data between the main memory and the buffer access cards is performed by a series of slave and master scanners synchronized to a common data buffer master clock. Each slave scanner additionally performs a "look ahead" function to determine which computer serviced by it is requesting an access into the common data buffer system.

A certain portion of the common data buffer main memory is organized as a series of "first in-first out" buffers and is utilized for the temporary storage of interrupt vectors to be transmitted to and from each attached computer. When that portion of the common data buffer main memory containing these "first in-first out" buffers (also called stacks) is addressed by an attached CPU, certain special control logic functions are activated, causing successive read or write operations to be sequenced into or from successive memory locations in the respective CPU stack.

An error correcting code (ECC) is transmitted with each data and address component involved in common data buffer transactions. The error correcting code is structured so as to enable correction of errors in transactions caused by noise and failed components in the system.

The main memory of the common data buffer system is a high speed, bit planar organized by polar memory, whose structure, in conjunction with the ECC, permits the common data buffer to operate with certain portions of the main memory inoperative.

For maximum reliability, all logic subassemblies employed in the design of this common data buffer system are provided with totally redundant power derived from independent sources.

Accordingly, it is an important object of the present invention to provide a highly efficient and fast buffer system communicating between computer system such as used in checking out, launch and operations of space vehicles, or any other application requiring efficient intercommunication between computers in a multiprocessor environment.

Another important object of the present invention is to provide an error free, reliable temporary storage device for information used in checking out, launching, and operating space vehicles.

Still another important object of the present invention is to provide a buffer system that is very flexible in that it can be readily used with many different brands and varieties of computers.

These and other objects of the invention will become apparent upon reference to the following specification, attendant claims, and drawings.

BRIEF DESCRIPTION OF THE DRAWINGS

FIGS. 2 and 2A illustrate in block form the data flow path of information through the common data buffer system.

FIG. 5 is a more detailed illustration of a memory card forming part of the common data buffer system.

DESCRIPTION OF A PREFERRED EMBODIMENT

Figure 1:
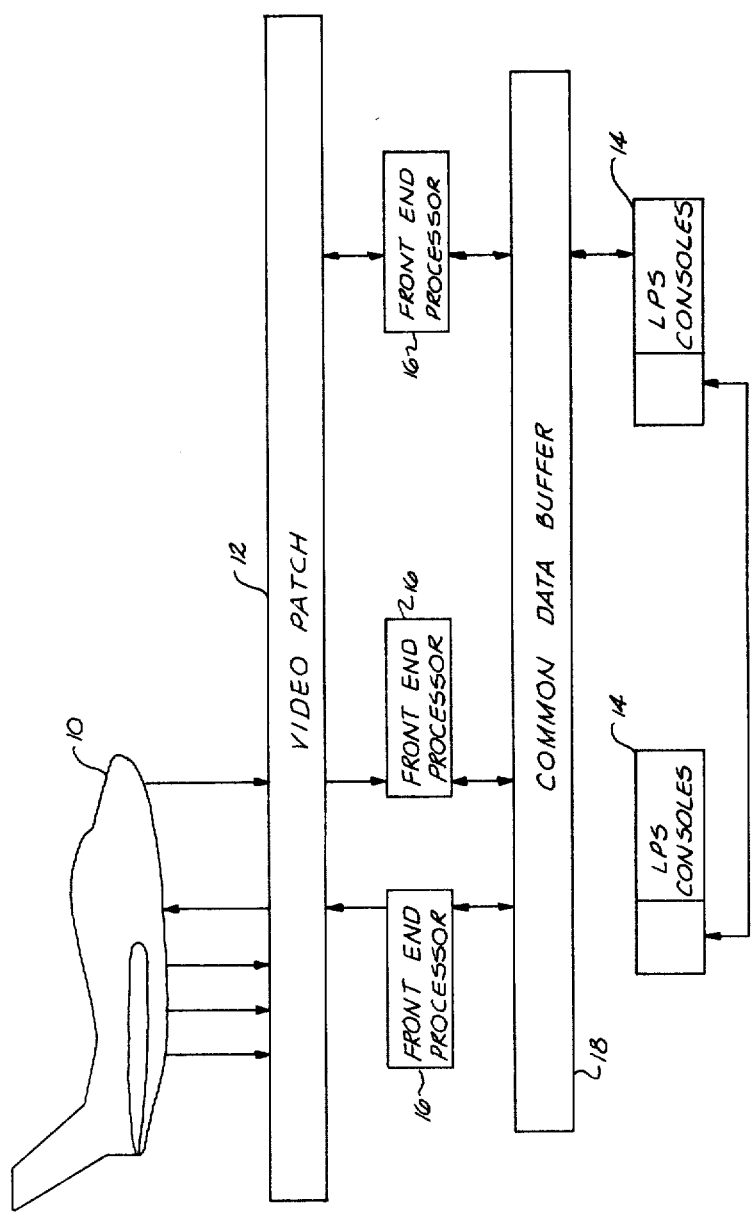
FIG. 1 is a block diagram illustrating a common data buffer constructed in accordance with the present invention being utilized as part of a checkout system for a space shuttle.

Referring in more detail to FIG. 1 of the drawings, there is illustrated a space shuttle generally designated by the reference character 10 which has communication lines extending therefrom through a video patch circuit 12 which is an automated patch board for selectively coupling lines to and from the space shuttle 10. Due to the complexity of the checkout and operation of the space shuttle it is necessary that a large amount of automated equipment such as computers, be used in the checking out and operating procedure. This requires efficient and high speed computers for providing communication throughout the system. As illustrated in FIG. 1, two of many launch processing systems 14 in the form of consoles, as well as front end processes 16 all of which include minicomputers are used for sending information to and from the space vehicle. All of these signals are transmitted through a common data buffer 18.

The buffer 18 is a high speed semiconductor memory with various logic circuits for implementing the communication therethrough.

Figure 2:
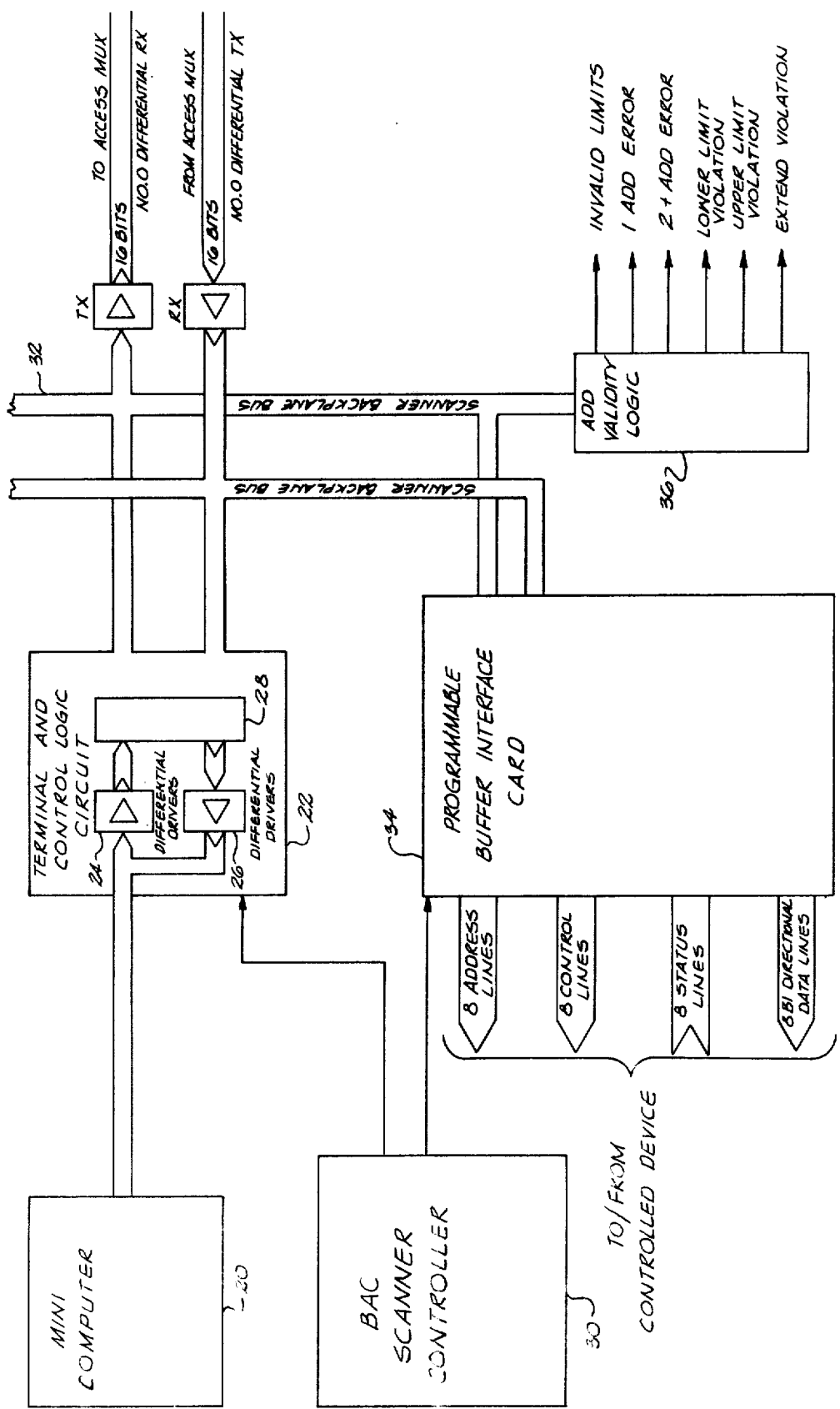

Referring in more detail to FIGS. 2 and 2A, there is illustrated a typical minicomputer 20 which is used for transmitting and receiving information to and from the space shuttle through the common data buffer 18. Normally, each of the LPS consoles 14 and front end processes include a minicomputer for transmitting and receiving the information.

Each of the minicomputers 20 communicate with the buffer 18 through a buffer access card 22 which, in turn, includes differential receivers 24, differential line drivers 26 and a register file 28. The information coming from the minicomputer 20 or being returned thereto is first fed to the differential receiver 24 for being stored in the register file 28. The return path from the register file is through the differential drivers 26 to the minicomputer 20.

Once the information is stored in the register file 28, it is then under control of a buffer access card scanner 30 (slave scanner) for reading out the stored information in the register file 20 at the appropriate time and allowing the information to be placed on a scanner backplane bus 32. The backplane bus 32 collects information from sixteen backplane cards under control of the slave scanner controller 30.

A programmable buffer interface card 34 can optionally be used (interchangeable with any of the buffer access cards 22) to communicate with external devices not requiring the capacity or speed of buffer access card 22.

Once the information is placed on the backplane bus 32 by the scanner, a series of address validity checks are performed by an address validity logic circuit 36 for ensuring that the data is being written in the proper location in the buffer. The address validity logic circuit 36 may be any suitable conventional address validity logic circuit.

After the address information that has been placed in the backplane bus 32 satisfies the validity check, the transaction is then continued by access multiplexer 38. In this particular system, there are up to four such multiplexers 38. Each of the multiplexers 38 is connected to a respective master scanner 40. The master scanner 40 sequentially gates the address information from the multiplexers 38 onto a memory address bus 42 and data to and from the memory data bus 44 and 54. The master scanner 40 sequences all data to and from the memory by using a control ROM for performing the routing functions. Any suitable conventional scanner could be used for the master scanner, and one such scanner is manufactured by Martin Marietta, Denver. Col. After the address information has been stored on the memory address bus 42, a stack control logic circuit 46 checks the memory address stored on the address bus 42 for predefined interrupt vectors.

If no interrupt vectors are found on the memory bus 42, then the data is written into or read from a memory location defined by the address stored on the address bus 42 on memory cards generally designated by the reference character 48. If an interrupt vector has been found in the address, a new stack address, generated by a stack pointer card 50 is substituted for part of the original address and causes the data to be written into or read from a memory location other than that indicated by the address information stored in the address bus 42.

The stacked pointer cards 50 recognize a specific address especially reserved among all of the buffer addresses for use as interrupt vector locations. Each interrupt request is stored in sequential memory locations with auto address increment being provided by hardware counters. As shown more specifically in FIGS. 3 and 4, one suitable stack pointer card is manufacture by Martin Marietta and has a model no. of 78K00358.

For every computer there is a stack pointer 50 which contains the necessary hardware and logic circuits for generating interrupts to another or other computers. The details of the stack pointer cards 50 will be discussed more fully below.

In the memory card 48, the address data contained on bus 42 and modifier bus 52 are error checked and combined and used to write into or read from one of sixty-four thousand memory locations provided in the memory cards 48. A read operation for the memory card is similar to a write operation, except that instead of writing data from bus 44 into memory card 48, the data information from memory card 48 is placed on the read data bus 54 and routed back through the multiplexer 38 by the master scanner 40 to the backplane bus 32 through the back card 22 to the computer under the control of the backcard scanner controller 30.

During the write and read operations any illegal or error conditions are fed back to the computer by means of the validity logic and other validity checking circuits.

In order to ensure that all data is transmitted correctly between computers, an error correcting code is used in conjunction with the data and the address and it is used to correct any error that is picked up by the system.

One of the advantages of the system constructed in accordance with the present invention is the ability of one or more of the many computers to interrupt the operation of another computer and vice versa when a high priority message has been despoited in the buffer for that computer.

Figure 3:
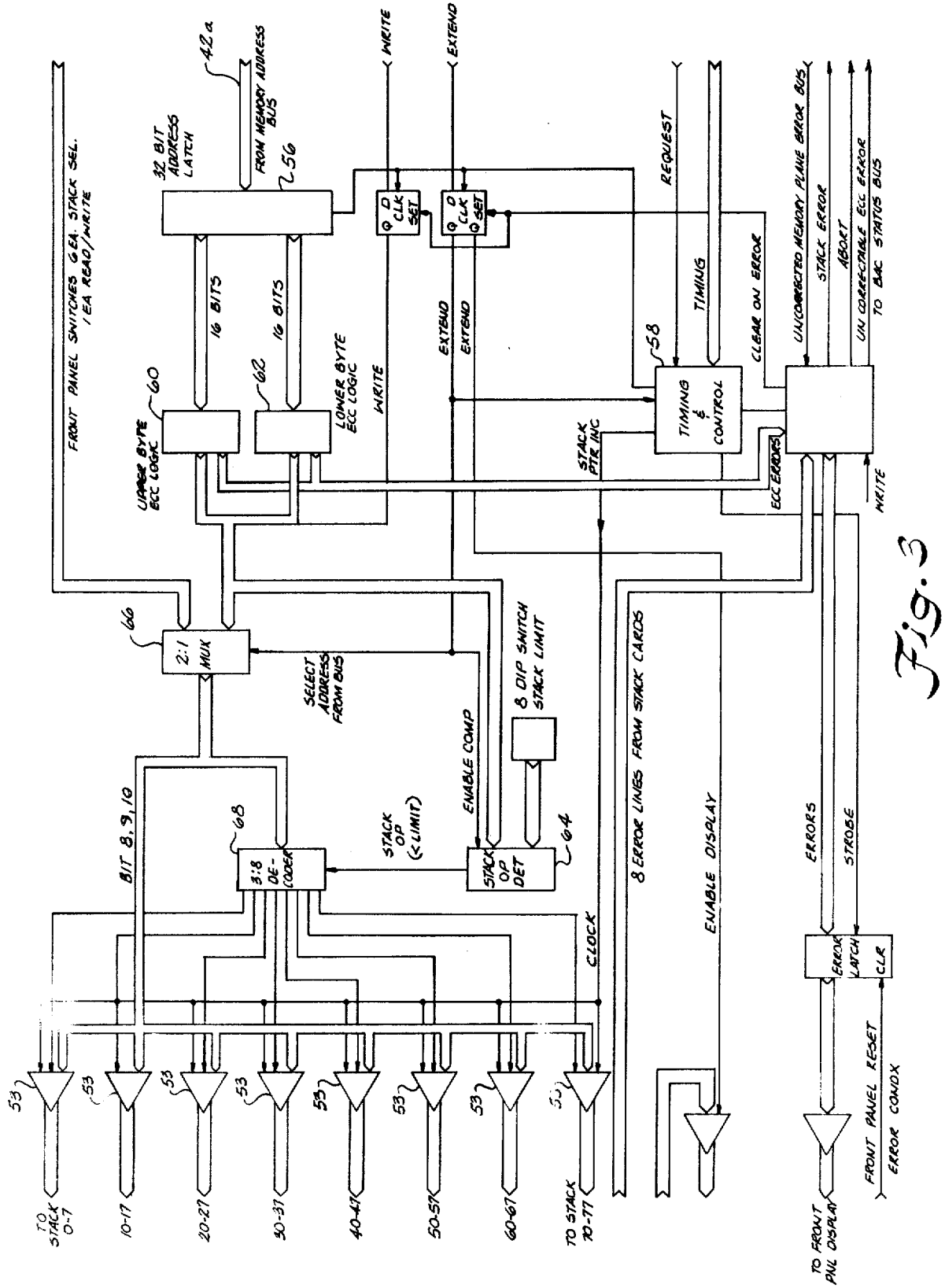
FIG. 3 is a more detailed block diagram illustrating a stack control logic circuit forming part of the common data buffer.
Figure 4:
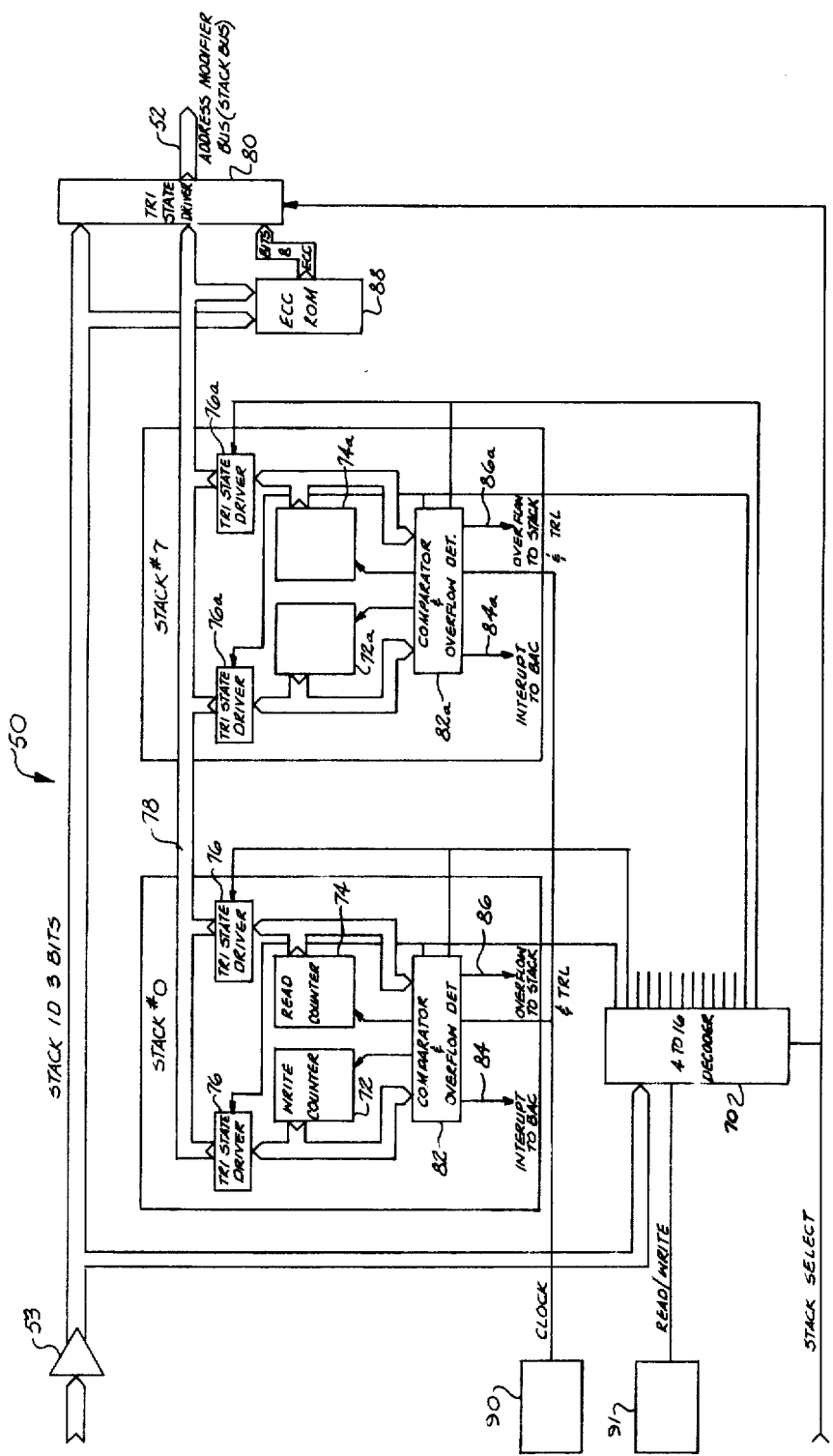
FIG. 4 illustrates the details of a stack card.

Referring now to FIG. 3 of the drawings, there is illustrated in block diagram form the stack control logic circuit 46.

The information coming into the stack controller 46 comes in over lead 42a from the memory address bus 42. This information is fed into a thirty-two bit address and ECC register 56 and is temporarily stored awaiting a timing and control signal from the timer and controller 58. It is subsequently error checked by upper and lower byte error control code logic circuits 60 and 62. If the information contains no error or a correctable error, the process continues. If it has no error, it is fed to a stack operation detector 64 which compares the signal with a preset stack limit. If the comparison indicates that the operation in process is a stack operation and that the address should be modified, then selected address bits are gated through a multiplexer 66, a decoder 68 to a preselected stack pointer card 50 through one of the line drivers 53. One of the particular stack pointer cards is illustrated in more detail in FIG. 4.

If it is not a stack operation, nothing further happens in the logic circuit illustrated in FIG. 3. If it is a stack operation, then further processing takes place in the stack card illustrated in FIG. 4. There are eight stack cards connected to appropriate output drivers 53. Each stack card contains up to eight stacks, one for a respective computer. The proper stack is selected by selected address bits contained in the address bus 42 which are processed in conjunction with decoders 68 and 70. A stack, upon being selected, provides an output from either a write counter 72 or a read counter 74 depending on whether a read or write operation is in progress. The output is provided through tristate drivers 76 and bus 78 to another tristate driver 80. The output of the tristate driver 80 is, in turn, connected to the address modifier bus 52 such as illustrated in FIG. 2A.

The output of the counters 72 and 74 are compared by comparator 82 and when they are equal, such constitutes no interrupt. A difference between the write counter 72 and the read counter 74 constitutes the number of interrupts pending for that computer. The interrupt signal is routed back through lead 84 to a respective computer to interrupt it. Every stack write operation will increment the write counter by one and every stack read operation will increment the read counter by one. Therefore, when the read counter 74 is equal to the write counter 72, all interrupts have been serviced.

The five bit counter 72 allows as many as thirty-one interrupts to be outstanding for each connected CPU. The vectors for servicing these interrupts are stored in thirty-one memory locations in memory 48. The counters 72 and 74 provide the least significant five bits of the address routed into the memory card 48 by means of the tristate driver over bus 52. The stack card number 7 illustrated in FIG. 4, operates in the identical manner as stack card number zero which was just previously described and the same reference characters are used for the components thereof with a suffix "a" applied thereto. It is to be understood that there are a total of eight stack pointers on each individual stack card. As previously mentioned, the decoder 70 selects the particular stack pointer that is to be used in the above operation. If there are more than thirty-one interrupt signals for any one CPU, an overflow signal is produced on output lead 86 of the comparator and overflow detector. This signal, in turn, is routed to the interrupt requesting computer advising that stack number zero cannot accept any more interrupt signals.

To ensure error-free transmission of the data on bus 78, it is combined with an error-correcting code produced by error-correcting code generator 88 for being transmitted back to the memory card 48 by means of bus 52. A clock 90 is used for synchronizing the operation of the various counters and components shown in FIG. 4. Similarly, a read-write signal identified by box 91 which is produced elsewhere in the circuit, is used for selecting which one of the read-write counters 72 or 74 that is to be selected. The read-write signal is derived from the original computer upon making the read or write request or command.

Referring now to FIG. 5, there is illustrated in more detail, the memory card generally designated by the reference character 48. Each of the memory cards 48 consists essentially of a one bit by sixty-four thousand bi-polar read/write memory 92 and associated address and control logic. Data to be written into the memory is fed in on lead 44 through temporary storage flip-flops generally designated by the reference character 96, and is then routed over lead 98 to the memory 92. The purpose of the temporary storage flip-flop 96 is to synchronize the data and address arriving on memory address bus 42 or data address bus 44. Such is a conventional method of synchronozing the input of signals. The address indicating where the data is to be written or stored in the memory 92, is received from the memory address bus 42 normally; however, when there is a stack operation, part of the address arrives from address modifier bus 52 and substitutes for some of the data normally arriving from address bus 42. This is accomplished by a multiplexer 100 which selects the information coming from address modifier bus 52 whenever there is a stack operation being performed.

Subsequently, the address passed through the multiplexer 100 is checked and corrected if necessary by the upper address byte logic circuit 102 and lower address byte logic circuit 104. If correct, or correctable, the address is then stored in the memory address register 106 to be used for writing the data coming from data memory bus 44 into the appropriate location within storage member 92.

During the read operation, address is processed in the same manner as the write operation; however, the data is now read from the memory 92 rather than written into the memory 92 and is fed out from the memory over lead 108 through OR-gate 110, data latch 112 to read data bus 54. It is subsequently routed back to the appropriate computer as previously described.

Temporary storage registers 114 and 116 are interposed between address bus 42 and the upper address byte logic circuit 102 and lower address byte logic circuit 104 for aiding in synchronizing the flow of information through the circuit. Upon encountering a noncorrectable address error as detected by the logic circuits 102 and 104, an error signal is produced by error logic circuits 118 which inhibits memory write operation and prevents incorrect address locations from being written into the memory 92. This is controlled by the logic circuit 120.

While a preferred embodiment of the invention has been described using specific terms, such description is for illustrative purposes only, and it is to be understood that changes and variations may be made without departing from the spirit or scope of the following claims.

What is claimed is:

1. A system for providing communication between computers and a plurality of memory storage cards according to the address signals supplied with information coming from the computers, said system comprising:
   (a) a plurality of register file means each provided for storing information coming from a respective computer;
   (b) a backplane bus connected to each of said register file means;

(c) a scanner means for reading out said information stored in said register file means in a predetermined sequence and temporarily storing said information in a respective backplane bus;

(d) a multiplexer connected to each backplane bus for receiving information from a respective backplane bus;

(e) a memory address bus connected to said plurality of memory storage cards;

(f) a memory data bus;

(g) a master scanner means for scanning said multiplexers and sequentially gating said information from said multiplexers to said memory address bus and said memory data bus;

(h) a stack control logic circuit means connected to said memory address bus for checking said information stored in said memory address bus and determining if said information contains any predefined interrupt vectors, said stack control logic circuit means writing said information stored on said memory data bus in said memory cards when no interrupt vectors are present said stack control logic circuit means comprising (h)(1) an address register connected to said memory address bus for temporarily storing said information coming from said memory address bus;

(h)(2) an error checking circuit means for comparing said information temporarily stored in said address register against an upper and lower error control code; and (h)(3) a stack pointer card means connected to said error checking circuit means for storing said data information on said memory data bus into said memory cards at the address on said memory address bus when no error is indicated by said error checking circuit.

2. The system as set forth in claim 1 further comprising:

(a) an address validity logic circuit means connected to said backplane bus for checking the address of said information stored therein.

3. The system as set forth in claim 1 wherein said stack pointer card means comprises:

(a) means for generating interrupt signals;

(b) a write counter;

(c) a read counter;

(d) means for comparing an output from said write counter with an output from said read counter for determining the number of interrupt signals pending for one of said computers, and (e) an interrupt counter means connected to said means for comparing for generating a signal that is fed back to said one of said computers when said stack pointer cards means cannot accept any more interrupt signals.

* * * * *